United States Patent [19]
Kronberg

[11] Patent Number: 5,143,149
[45] Date of Patent: Sep. 1, 1992

[54] WASTEWATER HEAT RECOVERY APPARATUS

[76] Inventor: James W. Kronberg, 108 Independent Blvd., Aiken, S.C. 29801

[21] Appl. No.: 718,518

[22] Filed: Jun. 21, 1991

[51] Int. Cl.$^5$ .................. F24D 17/00; F24H 1/16
[52] U.S. Cl. ............................ 165/32; 165/47; 165/163; 165/66; 165/909; 4/598; 4/545; 236/12.14
[58] Field of Search ............ 165/47, 66, 32, 163, 165/909; 236/12, 14; 4/545, 598

[56] References Cited

U.S. PATENT DOCUMENTS

| | | | |
|---|---|---|---|
| 2,161,417 | 11/1936 | Holmes | 165/901 |
| 2,756,739 | 7/1956 | Schaub | 236/12.1 |
| 2,803,408 | 8/1957 | Hope | 236/12.14 |
| 3,330,332 | 7/1967 | Warner | 236/12.11 |
| 3,958,555 | 5/1976 | Horne | 236/12.1 |
| 3,999,709 | 12/1976 | Estabrook | 165/901 |
| 4,037,567 | 7/1977 | Torres | 165/901 |
| 4,176,788 | 12/1979 | Holman | 165/901 |
| 4,210,102 | 7/1980 | Dosmann | 165/901 |
| 4,241,588 | 12/1980 | Murphy et al. | 165/901 |
| 4,258,878 | 5/1981 | Van Pachtenbeke | 165/901 |
| 4,300,247 | 11/1981 | Berg | 165/66 |
| 4,304,292 | 12/1981 | Cardone | 165/47 |
| 4,345,583 | 8/1982 | Moriz | 236/12.1 |
| 4,372,372 | 2/1983 | Hunter | 165/47 |
| 4,484,564 | 11/1984 | Erikson | 165/901 |
| 4,542,546 | 9/1985 | Desgagnes | 165/66 |

FOREIGN PATENT DOCUMENTS 0189236 10/1984 Japan .................. 165/47

Primary Examiner—John K. Ford
Attorney, Agent, or Firm—Harold M. Dixon; William R. Moser; Richard E. Constant

[57] ABSTRACT

A heat recovery system with a heat exchanger and a mixing valve. A drain trap includes a heat exchanger with an inner coiled tube, baffle plate, wastewater inlet, wastewater outlet, cold water inlet, and preheated water outlet. Wastewater enters the drain trap through the wastewater inlet, is slowed and spread by the baffle plate, and passes downward to the wastewater outlet. Cold water enters the inner tube through the cold water inlet and flows generally upward, taking on heat from the wastewater. This preheated water is fed to the mixing valve, which includes a flexible yoke to which are attached an adjustable steel rod, two stationary zinc rods, and a pivoting arm. The free end of the arm forms a pad which rests against a valve seat. The rods and pivoting arm expand or contract as the temperature of the incoming preheated water changes. The zinc rods expand more than the steel rod, flexing the yoke and rotating the pivoting arm. The pad moves towards the valve seat as the temperature of the preheated water rises, and away as the temperature falls, admitting a variable amount of hot water to maintain a nearly constant average process water temperature.

9 Claims, 2 Drawing Sheets

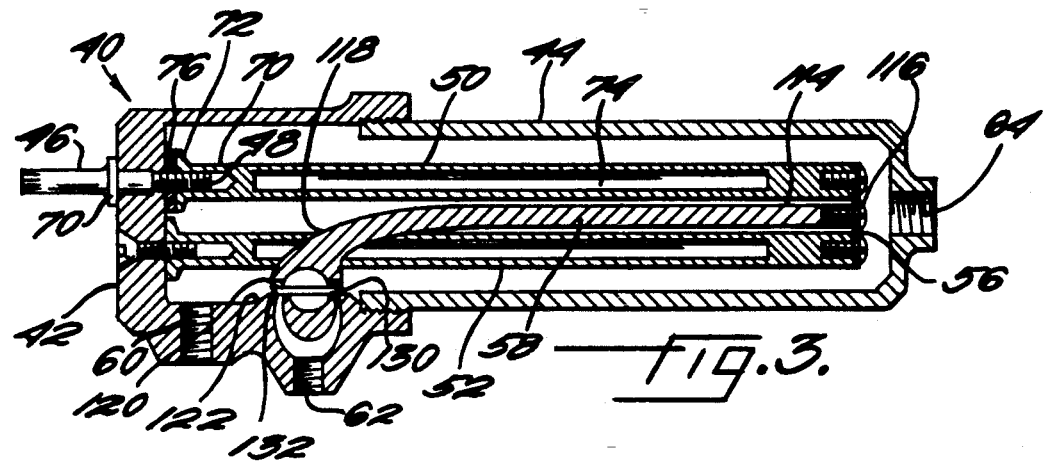

WASTEWATER HEAT RECOVERY APPARATUS

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to heat recovery. In particular, the present invention relates to an apparatus and method for recovering heat from wastewater.

2. Discussion of Background

Many industrial and domestic processes require the maintenance of a stable temperature in a stream of flowing liquid, despite the fact the new material is constantly entering and old material flowing out. This is often accomplished by blending two incoming streams, one above and one below the desired temperature, using proportioning valves.

In industrial processes, waste heat can be recovered from the outgoing stream and returned to the incoming low-temperature stream by a heat exchanger. Since some of the heat is unavoidably lost, the incoming high-temperature stream must make up the heat deficit. The flow rate of the high-temperature stream is adjusted by an automatic temperature controller to maintain equilibrium at the desired temperature.

Arrangements for domestic use are usually much simpler. Proportioning is done through hand-operated valves such as water faucets, with the temperature adjusted simply by touch. No effort is made to recover the heat which remains in used wash water. This not only wastes energy and money, but also makes the temperature more liable to sudden change if the pressure in the supply lines fluctuates.

The perceived benefit of industrial heat exchangers and temperature controllers is generally thought to be inadequate to justify their cost in a home plumbing system. However, this issue is not as clear-cut as it appears.

Suppose that a typical household contains two people who each shower once a day, using five gallons of water per shower. Suppose, further, that water enters the home at an average temperature of 70° F. (21° C.) and the shower water is used at 110° F. (43° C.). Heating 10 gallons of water per day by 40° F. (22° C.) requires about 25,000 BTU, or, in an all-electric household, 7.3 KWh. This amounts to 9.1 million BTU, or 2,700 KWh per year. At typical costs per KWh, anywhere from 30%–50% of the total cost of operating a 40-gallon hot water heater is spent on producing heated shower water.

Family members (or appliances such as a dishwasher or an icemaker) sometimes turn on water valves or faucets unexpectedly while others are showering. The flow through a valve is determined not only by the valve setting, but also by the pressure difference across it. Shower-water temperature is set by empirically balancing the faucet settings based upon the pressures existing at the time of setting. Sudden pressure changes can upset the balance, causing uncomfortable temperature shifts. At worst, painful scalding can result. A temperature shift of another sort, seldom dangerous but always aggravating, occurs when the water heater runs out of hot water in mid-shower.

A wastewater heat recovery system suitable for domestic or industrial use would be reasonably efficient, would include a temperature controller, require a minimal maintenance, and would conserve energy and thereby save a substantial portion of a typical household's water-heating costs. It would also contribute to home comfort and safety. Such a system would also be inexpensive and have a short payback period. An installation cost comparable to 1-2 years' energy savings could readily be justified on economic grounds alone. A somewhat higher cost might be allowable if comfort and safety were also taken into account.

SUMMARY OF THE INVENTION

According to its major aspects and broadly stated, the present invention is a heat recovery system with a heat exchanger and a mixing valve. A plumbing drain trap collects and directs wastewater to a heat exchanger, which then transfers heat from the wastewater to an adjacent stream of incoming, colder water. This preheated water is fed to an automatic mixing valve which adds hot water as needed to produce process water at a desired outlet temperature. The heat exchanger includes an inner coiled tube, a baffle plate, and four external pipe connectors for a wastewater inlet, a wastewater outlet, a cold water inlet, and a preheated water outlet. Wastewater enters the drain trap through the wastewater inlet, is slowed and spread by the baffle plate, and passes generally downward through the heat exchanger to exit at the wastewater outlet. Cold feedwater from a supply line enters the inner tube through the cold water inlet and flows through the tube in a generally upward direction, taking on heat from the relatively warm wastewater.

The mixing valve includes a housing with an inlet for preheated water from the heat exchanger, a hot water inlet, and a process water outlet. A flexible yoke, to which are attached an adjustable rod, two stationary rods, and a pivoting arm is contained within the housing. The adjustable rod is preferably fabricated of stainless steel or another corrosion-resistant alloy of low thermal expansion coefficient; the other rods are preferably die-cast of zinc or a high-zinc corrosion-resistant alloy. The free end of the pivoting arm widens to form a pad covered in elastic material such as rubber. The pad rests against a valve seat of similar geometric form. The rods and pivoting arm undergo thermal expansion or contraction according to the temperature of the incoming preheated water. Since the thermal expansion of zinc is about 3 times that of stainless steel, the zinc rods expand more than the steel rod, flexing the yoke. The pivoting arm also rotates, and the pad at its free end sweeps out a distance which is many times the difference in expansion between the steel and zinc rods. This motion is directed toward the valve seat as the temperature of the preheated water rises, and away from the valve seat as the temperature falls. The valve thus admits a variable amount of hot water to maintain a nearly constant average process water temperature. The adjustment screw can be rotated to set the temperature range in which the valve will operate.

An important feature of the present invention is the valve formed by the free end of the pivoting arm and the valve seat. Since the pad moves in a direction which is nearly perpendicular to the surface of the valve seat, wear on the seal is uniform and minimized. The pad and seat preferably have a double, ring-shaped line of contact. This feature virtually doubles the flow rate obtainable with a seat having a single, circular line of contact of equal size, while reducing the force which must be exerted by the pivoting arm to keep the valve closed. The apparatus is driven entirely by temperature effects so that no external power source is needed.

Another feature of the present invention is the opposing flow of wastewater and cold feedwater through the heat exchanger. The upward feedwater flow promotes more efficient heat exchange according to the countercurrent principle.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a cross-sectional view of a mixing valve according to a preferred embodiment of the present invention;

FIG. 4a is a cross-sectional view of one embodiment of the two fixed rods of the mixing valve of FIG. 3;

FIG. 4b is a cross-sectional view of an alternative embodiment of the two fixed rods of the mixing valve according to the present invention; and FIG. 5 is the flexible yoke of the mixing valve of the present invention.

DETAILED DESCRIPTION OF A PREFERRED EMBODIMENT

Figure 1:
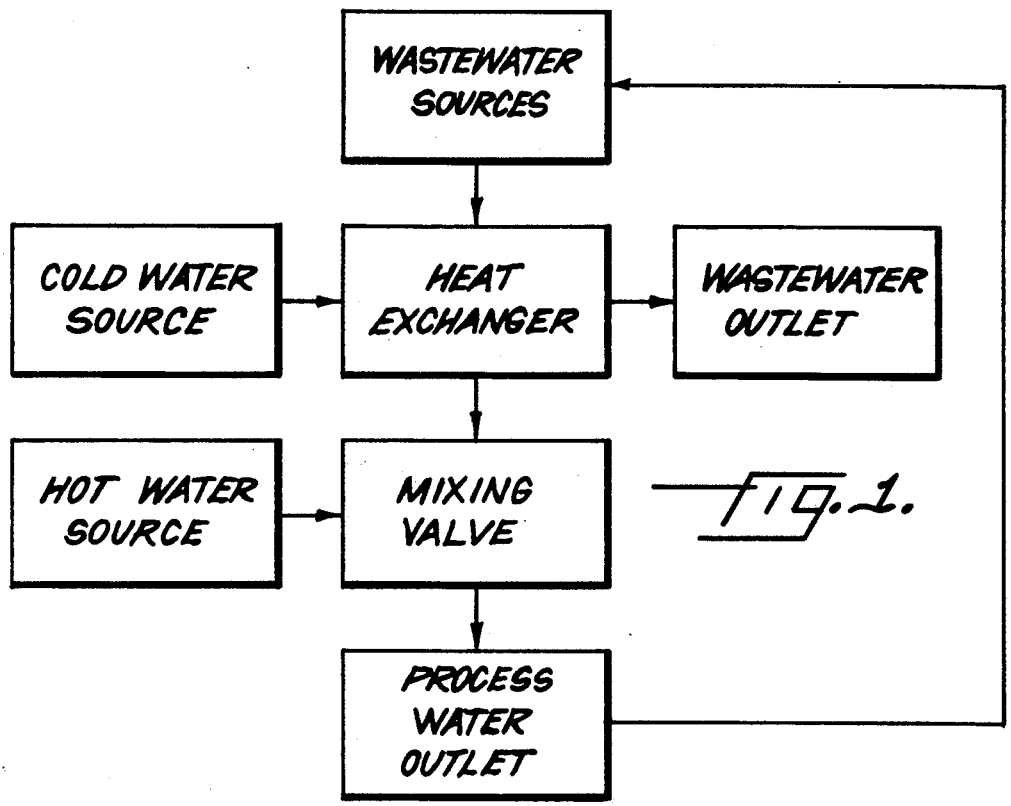
FIG. 1 is a schematic view of a heat recovery system according to a preferred embodiment of the present invention.

The present invention includes a plumbing drain trap with a heat exchanger to retain wastewater for a short time while heat is transferred from it to preheat an adjacent stream of incoming, colder water. This preheated water is fed to an automatic mixing valve which adds hot water as needed to produce process water at the desired outlet temperature, as shown in FIG. 1. The heat exchanger and mixing valve of this invention are designed to work together. Both parts are rugged, are driven entirely by temperature effects so that no external power source is needed, and use inexpensive materials and manufacturing methods.

Figure 2:
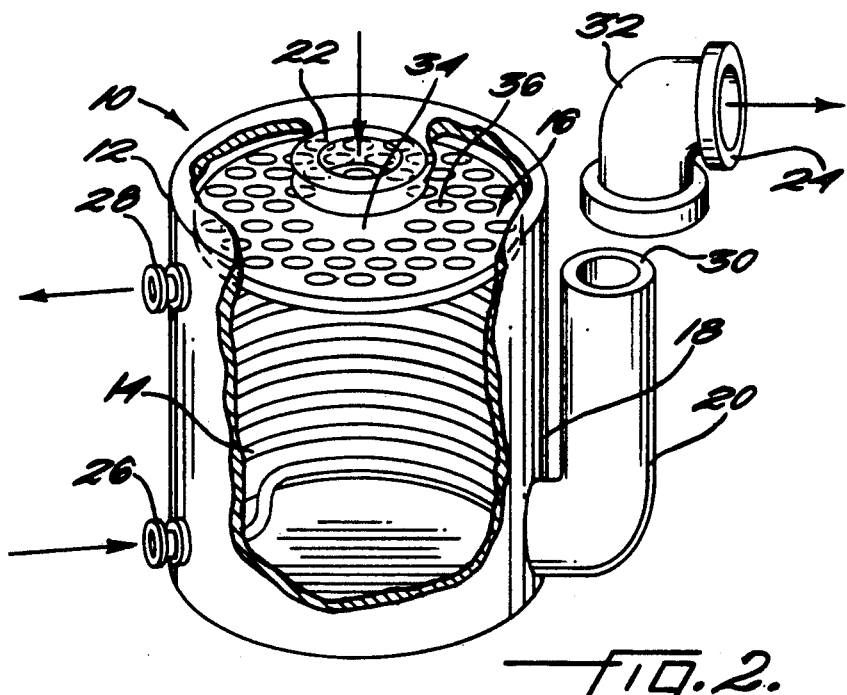
FIG. 2 is a cutaway view of a heat exchanger according to a preferred embodiment of the present invention.

Referring to FIG. 2, a preferred embodiment of heat exchanger 10 includes drain trap 12 with inner coiled tube 14 and baffle plate 16. Drain trap 12 includes a large-diameter cylinder 18 and a smaller, parallel side tube 20 which communicate at the bottom of cylinder 18. Drain trap 12 is preferably fabricated from two or more molded sections of polyvinyl chloride (PVC) joined together by solvent welding after the installation of coiled tube 14 and baffle plate 16. Four external pipe connectors form wastewater inlet 22, wastewater outlet 24, cold water inlet 26, and preheated water outlet 28. Wastewater inlet 22 may be molded as an integral part of cylinder 18. Side tube 20 may have a plain tube end 30 or other fitting to which is attached a separate right-angle fitting 32 of which wastewater outlet 24 is a part, as shown in FIG. 1. Alternatively, side tube 20 may have a right-angle bend molded into its upper end, terminating in wastewater outlet 24. Wastewater inlet 22 and outlet 24 may be any standard threaded or solvent-welded types customarily used in drain traps. Other joints or pipe connections may be present, as may be convenient for ease in manufacturing or flexibility in installation.

Inner tube 14 is made from a thin-walled flexible material of high heat conductivity, preferably copper, formed into a helical coil having roughly two-thirds the diameter of cylinder 18. Tube 14 is mounted such that the helix is approximately centered within cylinder 18 and the ends of tube 14 extend outwards through penetrations (not shown) in the wall of cylinder 18. The penetrations may be sealed by any convenient method which provides adequate mechanical strength to permit connection of external pipe without creating leaks from drain trap 12 to the outside. Tube 14 has cold water inlet 26 and preheated water outlet 28 soldered, brazed or otherwise attached to its ends. Inlet 26 and outlet 28 are preferably machined from brass to accept standard (NPT) pipe threads. Tube 14, inlet 26 and outlet 28 are sufficiently strong to withstand internal water pressures of 100-200 psi.

Baffle plate 16 is fabricated from perforated sheet metal or PVC. Plate 16 has a solid central region 34 and a perforated outer region 36. Central region 34 is of similar diameter to wastewater inlet 22 and is positioned directly below it. Plate 16 slows and spreads out the flow of wastewater entering through wastewater inlet 22, minimizing vertical mixing, and also screens out debris from the wastewater stream. The edges of plate 16 may or may not be attached to the inner wall of cylinder 18. Alternatively, a removable wire screen could be placed above or below wastewater inlet 22, as may be convenient, in order to catch debris before it reaches plate 16, thus facilitating cleaning.

Side tube 20, or the combination of side tube 20 with right-angle adapter 32, is of such a height as to maintain a standing water level in cylinder 18 well below wastewater inlet 22 but above the highest part of tube 14 under all reasonable flow conditions. If right-angle adapter 32 is a separate piece from side tube 20, the outlet pipe leading to the drain (not shown) may be run in almost any desired direction relative to the orientation of cylinder 18 and side tube 20.

In use, wastewater enters cylinder 18 through inlet 22 in a relatively narrow stream with significant velocity and momentum. Striking baffle plate 16, the wastewater stream is deflected by solid central portion 34 to flow more slowly through perforated outer region 36, entering the region below plate 16 with greatly reduced velocity. This permits thermal stratification, with warmer, less dense water at the top and cooler, denser water below. The wastewater moves gradually downward through cylinder 18 until it reaches the bottom, turns, and flows upward through side tube 20 until it reaches outlet 24 and spills over into the drain line which carries it away. The back-pressure of water in tube 20 maintains the level of water in cylinder 18 even with the lowest point of outlet 24, or slightly higher, depending upon the flow rate.

Simultaneously, cold feedwater from the supply line is introduced into tube 14 through cold water inlet 26 and flows through tube 14 in a generally upward direction. Heat flows from the relatively warm wastewater in cylinder 18 through the wall of tube 14 into the feedwater stream. Upward feedwater motion promotes more efficient heat exchange, according to the countercurrent principle. After traversing the length of tube 14, the heated feedwater exists heat exchanger 10 via outlet 28. Assuming that the two flows are roughly equal, the preheated water leaving tube 14 is now nearly as warm as the wastewater entering cylinder 18, while the exiting wastewater stream has been cooled nearly to the temperature of the entering feedwater. Most of the energy originally used to heat the wastewater is thus recovered for reuse.

A preferred embodiment of mixing valve 40 is shown in FIG. 3. Mixing valve 40 includes master housing 42, sleeve 44, adjustment rod 46 and screw 48, movable rod 50, fixed rods 52 and 54 (only rod 52 is shown), flexible yoke 56, and pivoting arm 58. Sleeve 44 may be screwed into housing 42, or be attached by some other convenient means. Two pipe connectors, preheated water inlet 60 for preheated water from heat exchanger 10, and hot water inlet 62 are disposed on housing 42. Sleeve 44 includes process water outlet 64, which exhausts a constant-temperature mixture of the two. Connectors 60, 62, and 64 are all preferably female NPT type.

Housing 42 and sleeve 44 are preferably fabricated from chlorinated PVC or other tough and high-melting plastic, in the same manner as drain trap 12. Adjustment rod 46 is preferably stainless steel, extending through the wall of housing 42. Rod 46 bears a flange or collar 70 which rests against the outer surface of housing 42, preventing inward motion of rod 46. The other end of rod 46, extending into the interior of housing 42, is threaded to form adjustment screw 48. Alternatively, a section of threaded rod 48 may be rigidly attached to the inner end of rod 46, sharing the same longitudinal axis. The threads of screw 48 engage matching threads in a tapped hole at one end 70 of rod 50, which bears at end 70 a flange or other enlarged bearing surface 72. Rod 50 is preferably made of stainless steel or other corrosion-resistant alloy of low thermal expansion coefficient, with a hollow central portion 74 to reduce its thermal mass without significantly affecting its rigidity. The threads of screw 48 and within rod 50 are made as fine as possible, consistent with strength. A washer 76 of rubber or other waterproof elastic material is placed between flange 72 and the inner surface of housing 42, surrounding screw 48. Rotation of rod 46 thus draws rod 50 towards housing 42 or allows the force of compressed washer 76 to push it away, providing a very precise means of positioning rod 50 lengthwise within housing 42.

Mounted parallel to rod 50 is a pair of rods 52 and 54, each similar in shape to rod 50, as shown in FIG. 4a. Rods 52 and 54 are preferably die-cast of zinc or a high-zinc corrosion-resistant alloy. Some other corrosion-resistant material with a similarly high thermal expansion coefficient (about three times that of stainless steel) may be used if convenient. Like rod 50, rods 52 and 54 have hollow cores, which reduce their thermal mass without significantly affecting their rigidity. Alternatively, a single rod 80, as shown in FIG. 4b, may be used. Rod 80 consists of two structures similar to rod 50 in shape but joined at one or both ends by bridges 82 and 84 or otherwise. Ends 86 and 88 of rods 52 and 54 are secured to housing 42 by stainless steel machine screws 90, or by an equivalent method.

Ends 92 and 94 of rods 52 and 54 are attached to triangular yoke 56 by stainless steel machine screws 96 or some equivalent method (see FIG. 4a). Yoke 56 is preferably formed of stiff but elastic, corrosion-resistant material such as spring stainless steel. As shown in FIG. 5, yoke 56 is pierced with two round holes 100 for attachment to rods 52 and 54, round hole 102 for attachment to rod 50, round hole 104 for attachment to pivoting arm 58, and one or more optional slots or other openings 106 to concentrate flexing along axes 110 and 112 in the regions between holes 100 and 104 and between holes 102 and 104. Rods 50, 52, and 54 thus form a rigid tripod-like support for yoke 56.

Pivoting arm 58 is attached at one end 114 to the center of yoke 56, by means of machine screw 116 running through hole 104 or otherwise. Arm 58 runs parallel to rods 50, 52 and 54 for a portion of its length, then curves so as to pass between rods 52 and 54, or through the open center portion of rod 80 (see FIG. 3). Arm 58 is preferably die-cast from zinc alloy. End 118 of arm 58 widens to form pad 120, preferably ring-shaped with an open center, and covered in elastic material such as rubber. Pad 120 rests against valve seat 122, of similar geometric form to pad 120. Valve seat 122 is molded or machined into the inner surface of master housing 42, or fabricated separately and joined to master housing 42 during assembly. valve seat 122 closes hot water inlet 62 when covered by pad 122.

Feed water (preheated by passage through heat exchanger 10) enters the valve through inlet 60 and travels down the length of rods 50, 52 and 54 before exiting through outlet 64. The flow rate is preferably controlled by a hand-operated faucet or proportioning valve of any standard type (not shown) typically placed downstream of outlet 64 near the point of water use.

Varying amounts of hot water enter through inlet 62 and mix with the cold-water stream. Rods 50, 52 and 54 quickly take on the temperature of the passing water and undergo thermal expansion or contraction accordingly. The thermal expansion of zinc is about 35 parts per million per degree C; that of stainless steel is much less, about 12 parts per million, while certain "specialty" alloys such as "INVAR" offer nearly zero expansion, although at a higher cost. Accordingly, rods 52 and 54 expand more than rod 50, slightly but with great force. Yoke 56 flexes, its center portion rotating slightly, to conform to the change in temperature.

Since pivoting arm 58 is attached to the rotating portion of yoke 56, it also rotates, so pad 120 sweeps out a distance which is many times the difference in expansion between rods 50, 52 and 54. For example, if rods 50, 52 and 54 are each 30.5 cm long, arm 58 is 28.0 cm long and the working distance between flexing axes 110 and 112 of yoke 56 is 1 cm, pad 120 will move about 0.02 cm per degree C. This motion will be directed toward valve seat 122 as the temperature rises, and away from valve seat 122 as the temperature falls. The valve formed by pad 120 and seat 122 accordingly opens at lower temperatures, and closes at higher ones, thus admitting a variable amount of hot water to maintain a nearly constant average temperature along the length of rods 50, 52 and 54. Since arm 58 is preferably die-cast of zinc alloy, its thermal expansion nearly cancels that of rods 50, 52 and 54. Pad 120 thus moves in a direction which is nearly perpendicular to the surface of valve seat 122, minimizing wear on the elastic material which forms the seal. Screw 48 can be rotated by means of rod 46, moving rod 50 slightly towards or away from master housing 42, to set the temperature range in which the valve will operate.

Despite the amplification by pivoting arm 58 of the differential expansion of rods 50, 52 and 54, the motion is still quite small in comparison with that of other valves. The lever action of arm 58 also limits the force available at pad 120 to a small fraction of that exerted by rods 50, 52, and 54. For these reasons, the valve formed by pad 120 and valve seat 122 is preferably of unconventional design, having a double, ring-shaped line of contact, consisting of an inner circle 130 and an outer circle 132, between the pad and the seat (FIG. 3). This virtually doubles the flow which would be obtained with a conventional seat, such as that of a conventional water faucet, having only a single, circular line of contact of equal size. At the same time, by lessening the area of pad 120 which is exposed to the incoming water stream, it reduces the force which must be exerted by arm 58 to keep the valve closed.

All parts in contact with the zinc die-castings (rods 52, 54 and 58) are preferably made of non-electrically-conductive materials or stainless steel, which quickly forms a nonconductive coating when exposed to air or water, to protect the zinc from galvanic corrosion. No brass or copper parts should be allowed to come in contact with the zinc parts. Alternatively, the zinc parts may be given a protective layer to seal out water and other corrosive materials.

Working together, heat exchanger 10 and mixing valve 40 provide a cost-effective way of recovering the energy used to heat water and delivering a constant-temperature stream to the point of use. If desired, heat exchanger 10 may also be used alone to preheat the water entering a domestic hot water heater, for comparable overall energy savings. Material and manufacturing costs are potentially low enough for domestic use, and the mechanism is simple and rugged enough that it should be virtually maintenance-free.

It will be apparent to those skilled in the art that many changes and substitutions can be made to the preferred embodiment herein described without departing from the spirit and scope of the present invention as defined by the appended claims.

What is claimed is:

1. Apparatus for providing process water from water having a first temperature using wastewater having a second temperature and hot water having a third temperature, said first temperature lower than said second temperature and said third temperature higher than said second temperature, said apparatus comprising:
   heat exchange means for placing wastewater in thermal communication with said water so that heat flows from said wastewater to said water to form preheated water having a fourth temperature, said fourth temperature intermediate said first and said second temperatures; and,
   mixing means in fluid communication with said heat exchange means for mixing said preheated water with said hot water to produce process water having a fifth temperature intermediate said third temperature and said fourth temperature,
   said mixing means having valve means for admitting a variable amount of said hot water to said mixing means in response to the temperature of said preheated water, said valve means having an open position and a closed position, said valve means admitting essentially no hot water when in said closed position,
   said mixing means having means for adjusting said valve means to change the temperature of said process water,
   said valve means further comprising
      at least one first rod having a first thermal expansion coefficient,
      at least one second rod, separate from said at least one first rod, having a second thermal expansion coefficient, at least one second thermal expansion coefficient being greater than said first thermal expansion coefficient,
      yoke means for connecting said least one first and said at least one second rod together,
      said preheated water producing thermal expansion of said at least one first and said at least one second rods, thereby causing a deflectin of said rods,
      said valve means moving in response to said deflection between said open position and said closed position.

2. The apparatus as recited in claim 1, wherein said at least one first and said at least one second rods are hollow to reduce thermal mass without reducing rigidity.

3. The apparatus as recited in claim 1, wherein said mixing means further comprises a valve seat for inflow of said hot water, said valve seat having a double, ring-shaped line of contact with said valve means when said valve means is in said closed position.

4. The apparatus as recited in claim 1, wherein said valve means further comprises:
   a pivot arm attached to said at least one first and said at least one second rod, 5. The apparatus as recited in claim 4, wherein said at least one first and said at least one second rods are hollow to reduce thermal mass without reducing rigidity.

6. The apparatus as recited in claim 4, wherein said mixing means further comprises a valve seat for inflow of said hot water, said valve seat having a double, ring-shaped line of contact with said valve means when said valve means is in said closed position.

7. The apparatus as recited in claim 1, wherein said water flows in a first direction in said heat exchanger and said wastewater flows in a second direction in said heat exchanger, said first direction being generally counter to said second direction.

8. The apparatus as recited in claim 1, wherein said heat exchange means further comprises:
   a housing having
      a first inlet,
      a first outlet,
      a second inlet, and
      a second outlet,
      said first and second inlets and outlets disposed on said housing and communicating with said housing interior so that said water enters said housing at said first inlet and said preheated water exits said housing at said first outlet, said water flowing in a first direction from said first inlet to said first outlet, and said wastewater enters said housing at said second inlet and exits said housing at said second outlet, said wastewater flowing in a second direction from said second inlet to said second outlet, said first direction being counter to said second direction;
   water conduit means for carrying said water from said first inlet to said first outlet, said water conduit means in the form of a coil and mounted within said housing, said water conduit means in fluid connection with said first inlet and said first outlet; and pl baffle means for slowing and dispersing the flow of said wastewater in said heat exchanger.

9. Apparatus for providing process water from water having a first temperature using wastewater having a second temperature and hot water having a third temperature, said first temperature lower than said second temperature and said third temperature higher than said second temperature, said apparatus comprising:

heat exchange means for placing wastewater in thermal communication with said water so that heat flows from said wastewater to said water to form preheated water having a fourth temperature, said fourth temperature intermediate said first and said second temperatures; and mixing means in fluid communication with said heat exchange means for mixing said preheated water with said hot water to produce process water having a fifth temperature intermediate said third temperature and said fourth temperature, said mixing means having valve means for admitting a variable amount of said hot water to said mixing means in response to the temperature of said preheated water, said valve means having an open position and a closed position, said valve means admitting essentially on hot water when in said closed position, said mixing means having means for adjusting said valve means to change the temperature of said process water, said mixing means having a valve seat inflow of said hot water, said valve seat having a double, ring-shaped line of contact with said valve means when said valve means is in said closed position.

* * * * *